United States Patent
Li et al.

(10) Patent No.: US 7,250,236 B2
(45) Date of Patent: *Jul. 31, 2007

(54) COLOR FILTER OF LIQUID CRYSTAL DISPLAY PANEL AND METHOD OF FABRICATING THE SAME

(75) Inventors: Huai-An Li, Taoyuan (TW); Ming-Feng Tsai, Tainan (TW); Yu-Cheng Lo, Taipei (TW)

(73) Assignee: Chungwa Picture Tubes, Ltd., Taipei (TW)

( * ) Notice: Subject to any disclaimer, the term of this patent is extended or adjusted under 35 U.S.C. 154(b) by 422 days.

This patent is subject to a terminal disclaimer.

(21) Appl. No.: 10/862,351

(22) Filed: Jun. 8, 2004

(65) Prior Publication Data
US 2005/0248699 A1  Nov. 10, 2005

(30) Foreign Application Priority Data
May 10, 2004  (TW) .............................. 93113096 A

(51) Int. Cl.
*G02B 5/20* (2006.01)
*G02F 1/1335* (2006.01)
(52) U.S. Cl. .......................... 430/7; 349/106; 349/110; 347/106
(58) Field of Classification Search ..................... None
See application file for complete search history.

(56) References Cited

U.S. PATENT DOCUMENTS

| | | | | |
|---|---|---|---|---|
| 5,691,011 A | * | 11/1997 | Newsham et al. | 428/1.31 |
| 6,228,435 B1 | * | 5/2001 | Yoshikawa et al. | 427/489 |
| 2004/0151994 A1 | * | 8/2004 | Tsai et al. | 430/7 |

* cited by examiner

*Primary Examiner*—John A. McPherson

(57) ABSTRACT

A color filter of liquid crystal display (LCD) panel is described. A surface property of a black matrix is changed by coating with an ink-repellent layer formed of cheap materials, to provide better separation between portions of a colored layer, thus reducing the cost of the ink-repellent layer and avoid overflowing while color ink drops are attaching onto a transparent substrate. In addition, a method of fabricating a color filter of LCD panel is described. The ink-repellent layer is transferred onto the black matrix, and then the colored layer is formed thereon. The ink-repellent layer effectively separates the colored layer. This method of the invention greatly diminishes the usage of the ink-repellent layer, steps of exposure and development, and the cost and time of fabricating the color filter.

18 Claims, 5 Drawing Sheets

COLOR FILTER OF LIQUID CRYSTAL DISPLAY PANEL AND METHOD OF FABRICATING THE SAME

FIELD OF THE INVENTION

The present invention relates to a color filter of a liquid crystal display (LCD) panel, and more particularly, to an ink-repellent layer on a black matrix of the color filter.

BACKGROUND OF THE INVENTION

A liquid crystal display (LCD) panel is mainly colorized by a color filter. The liquid crystal (LC) molecules, which are arranged in rows or twists by changing the voltage of the driver integrated circuit (IC), can form gates to determine whether a backlight can pass through the LC molecules or not, so as to generate pictures on the LCD panel. However, the LCD panel shows only two colors in black or white due to the difference in levels of the light penetration. If the LCD panel is to show colors, it needs a combination of three light sources of red (R), green (G), and blue (B). Hence, a color filter with three colored layers of red, green, and blue is a key component of the LCD panel.

Reference is made to FIG. 1, which illustrates a cross-sectional diagram showing a color filter in the prior art. The color filter 100 comprises a transparent substrate 100 made of, for example, glass. A black matrix 103 is disposed on the transparent substrate 101. The black matrix 103 is used as a light-shielding, anti-reflection layer to avoid color mixing and color contrast enhancement. A plurality of apertures 105 is located in the black matrix 103 to expose a part of the transparent substrate 101. The colored layers 107 of transparent red, green, and blue are formed in the apertures 105, respectively. The colored layers 107 are covered with a protective layer 109 and a transparent ITO (Indium-Tin Oxide) conductive film 111 in turn.

The color filter usually has properties of high color purity, high transparency, high contrast, low reflectivity, and must be stably resistant to heat, light and chemicals. There are currently are four common methods of coating the colored layers on the color filter, a dyeing method, a pigment dispersion method, an electro-deposition method, and a printing method. However, the above methods require complicated processes and expensive equipment, and have limitations regarding the size of the color filter. In addition, the increase in processes and the size causes the yield to be decreased, and results in wasting a great quantity of material and increasing the cost of the production. To solve the problems of fabricating the colored layers of the foregoing color filter, the ink-jet technique has been recently developed to reduce the consumption of negative photoresists as well as steps of exposure and development.

The ink-jet technique is excellent because it uses small-sized equipment, less process time and less ink. Generally, the ink-jet technique is divided into Piezoelectric ink-jet and thermal bubble ink-jet methods, and it may replace the conventional method of fabricating the color filter in the future. However, the ink-jet technique is applied to produce the colored layer of the color, and the colored ink drops with enhanced diffusibility when injected into the apertures of the black matrix may overflow even to result in color mixing and color contrast deterioration.

Reference is made to FIGS. 2(a) to 2(c), which illustrate cross-sectional diagrams of the process of the color filter in the prior art. The process may be a method of manufacturing the color filter disclosed in the U.S. Pat. No. 6,399,257. A photosensitive resin 141 is formed on the transparent substrate 131 and the apertures 135 of the black matrix 133, as shown in FIG. 2(a). Next, a step of backside exposure is performed, in which an exposed region of the photosensitive resin 141 becomes an ink-absorbent layer 145 and an unexposed region becomes an ink-repellent layer 147, as shown in the structure of FIG. 2(b). Subsequently, colored ink drops are injected into the apertures 135 of the black matrix 133 by the ink-jet technique, and then a colored layer 149 is formed, as shown in the structure of FIG. 2(c). The aforementioned ink-repellent layer 147 can separate the portions of colored layer 149 from each other, thus can reduce the problem of the colored ink drops overflowing.

Reference is made to FIGS. 3(a) to 3(c), which illustrate cross-sectional diagrams of the process of another color filter in the prior art. The process may be a color filter and method of manufacturing the same disclosed in the E. P. Pat. No. 1,061,383. An organic photosensitive film 155 is applied on the transparent substrate 151 and the black matrix 153, as shown in the structure of FIG. 3(a). Next, steps of exposure and development are performed, and a plurality of apertures 157 is formed in the photosensitive film 155 and the black matrix 153 to expose a part of the transparent substrate 151, as shown in the structure of FIG. 3(b). The organic photosensitive film 155 is used as an ink-repellent layer. Subsequently, colored ink drops are injected into the apertures 157 of the black matrix 153 by the ink-jet technique, and then a colored layer 159 is formed as shown in the structure of FIG. 2(c). The aforementioned organic photosensitive film 155 is used as the ink-repellent layer to separate the portions of colored layer 159 from each other, thus can reduce the problem of the colored ink drops overflowing.

In brief, the prior solution directed to the problem of the colored ink drops overflowing mainly focuses on changing the surface property of the black matrix. In other words, the problem of the colored ink drops overflowing is improved by adding the ink-repellent layer on the black matrix. However, the cost of fabricating the ink-repellent layer is higher. It is necessary to coat more the ink-repellent layer uniformly over the transparent substrate and the black matrix. Furthermore, the ink-repellent layer must be formed from steps of exposure and development.

SUMMARY OF THE INVENTION

It is an aspect of the present invention to provide a color filter of a LCD panel. The color filter utilizes an ink-repellent layer, which is formed with cheap materials, to change a surface property of a black matrix for better separating portions of a colored layer from each other, so as to decrease the cost of the ink-repellent layer and prevent the colored ink drops from overflowing.

It is another aspect of the present invention to provide a method of producing a color filter of a LCD panel. An ink-repellent layer is transferred onto the black matrix, and then the colored layer is formed thereon. Therefore, the ink-repellent layer can effectively isolate the colored layer. The method of the present invention can greatly reduce the cost of the ink-repellent layer, steps of exposure and development, and the cost and time of fabricating the color filter.

According to the aforementioned aspect of the present invention, a color filter of a LCD panel is provided, which comprises a transparent substrate and a black matrix having a plurality apertures to expose a part of the transparent. An ink-repellent layer is disposed on the black matrix, in which a material of the ink-repellent layer comprises an ester compound and a silicon-containing mixture. A colored layer is formed in the apertures.

In a preferred embodiment of the present invention, a formula (I) of the ester compound is shown as follows:

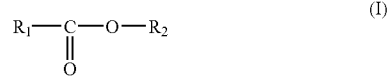

where the $R_1$ is selected from the group consisting of hydrogen and C1-C3 alkyl radical, and the $R_2$ is selected from the group consisting of substituted and un-substituted C5-C18 linear and branched alkyl radical, substituted and un-substituted C5-C18 cyclic alkyl radical, and substituted and un-substituted C5-C18 aromatic radical.

In a preferred embodiment of the present invention, a material of the aforementioned silicon-containing mixture is silicon oxide ($SiO_x$).

According to the aforementioned aspect of the present invention, it is further provided a method of fabricating color filter of LCD panel, which comprises steps as follows. A transparent substrate is provided. Next, a black matrix is formed on the transparent substrate, with a plurality of apertures in the black matrix to expose a part of the transparent substrate. An ink-repellent layer is then formed on the black matrix, the black matrix material comprising an ester compound and a silicon-containing mixture. A colored layer is then formed in the apertures by an ink-jet method.

In a preferred embodiment of the present invention, the step of forming the ink-repellent layer further comprises steps as follows. The ink-repellent layer is coated onto a transferred film, then the transferred film is formed with the ink-repellent layer. The ink-repellent layer is then transferred from the transferred film onto the black matrix, for forming the ink-repellent layer on the black matrix.

The color filter utilizes an ink-repellent layer, formed of cheap materials, to change a surface property of a black matrix for better separating portions of a colored layer from each other. Hence, it prevents the colored ink drops from overflowing while the color ink drops are attaching onto the transparent substrate, and greatly reduces the usage of the ink-repellent layer, steps of exposure and development, and the cost and time of fabricating the color filter.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The color filter of the LCD panel of the present invention utilizes an ink-repellent layer, formed of cheap materials, to change a surface property of a black matrix, for better separating portions of a colored layer from each other and preventing the colored ink drops from overflowing while color ink drops are attaching onto the transparent substrate. In order to describe the color filter of the LCD panel of the present invention more explicitly and completely, the following description is stated with reference to FIG. 4.

Figure 1:
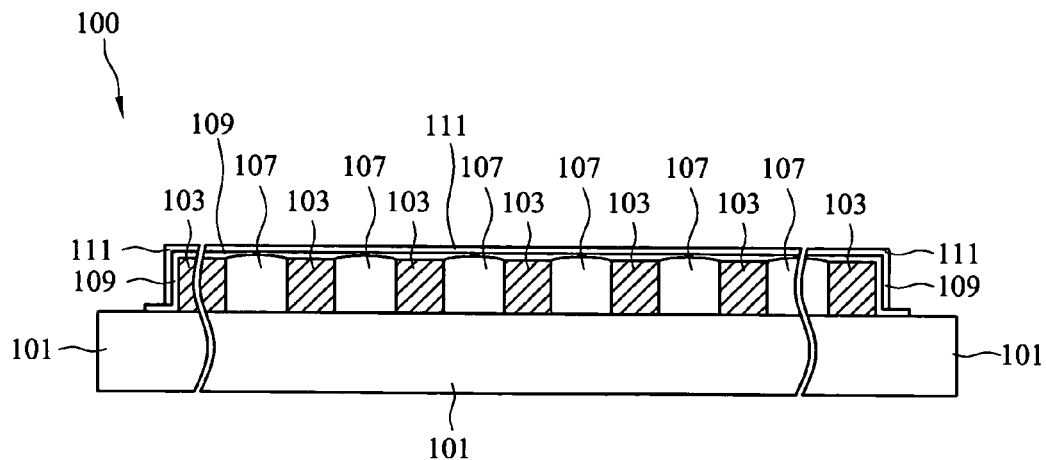
FIG. 1 is a cross-sectional diagram showing a color filter in the prior art.
Figure 2A:
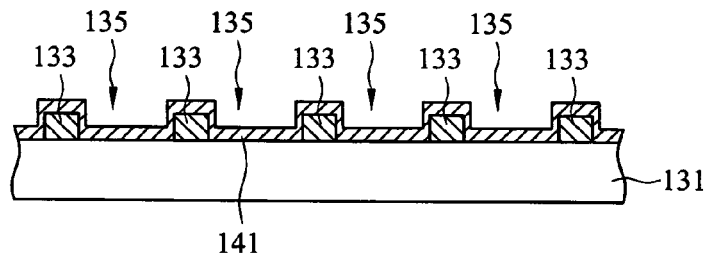
FIGS. 2(a) to 2(c) are cross-sectional diagrams of the process of the color filter in the prior art.
Figure 2B:
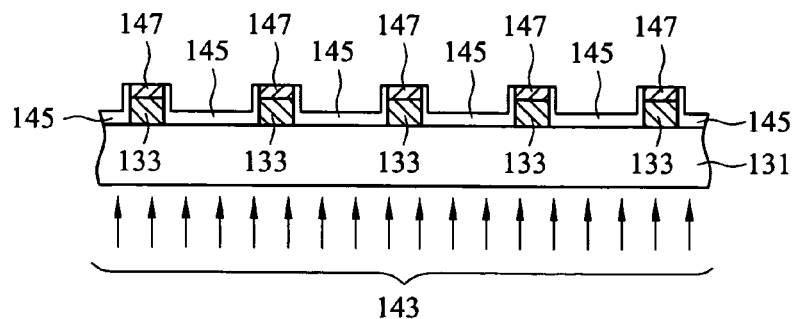
Figure 2C:
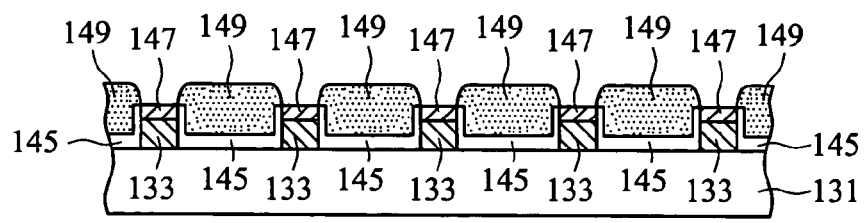
Figure 3A:
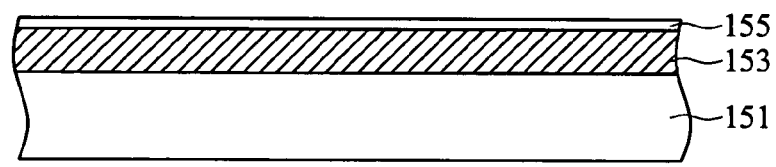
FIGS. 3(a) to 3(c) are cross-sectional diagrams of the process of another color filter in the prior art.
Figure 3B:
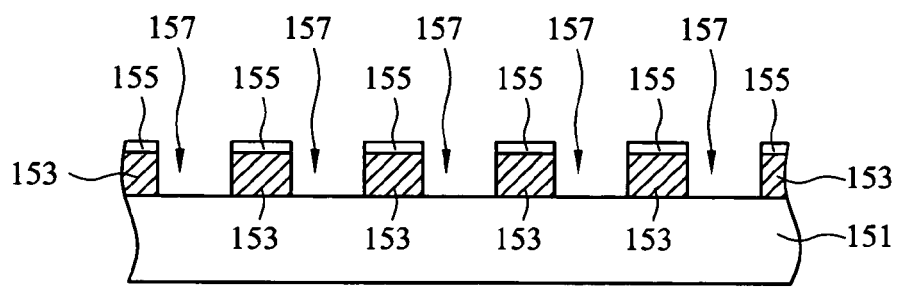
Figure 3C:
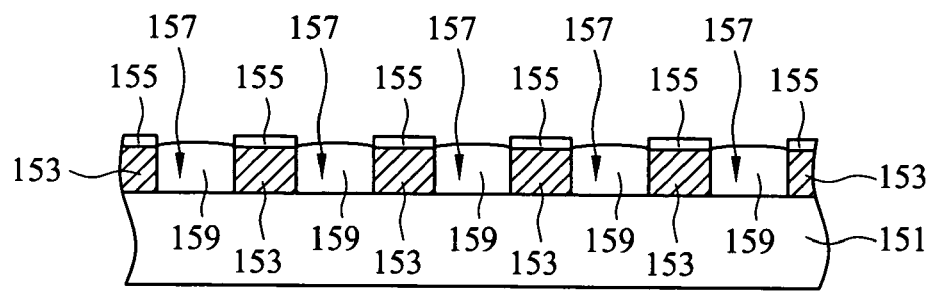
Figure 4:
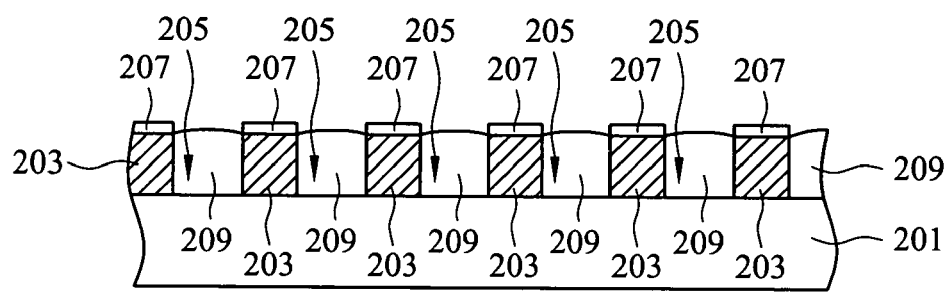
FIG. 4 is a cross-sectional diagram of the color filter of the LCD panel in accordance with a preferred embodiment of the present invention.

Reference is made to FIG. 4, which is a cross-sectional diagram of the color filter of the LCD panel in accordance with a preferred embodiment of the present invention. The color filter 200 of the LCD panel comprises a transparent substrate 201 made from, for example, glass. A black matrix 203, which is disposed on the transparent substrate 201, is made of a material such as resin or metal and used as a light-shielding, anti-reflection layer for avoiding color mixing and enhancing color contrast. A plurality of apertures is located in the black matrix 203 to expose a part of the transparent substrate 201, wherein the apertures 205 is in an array of, for example, mosaic, triangular, or striped patterns. An ink-repellent layer 207 is disposed on the black matrix 203, wherein the material of the ink-repellent layer 207 comprises an ester compound and a silicon-containing mixture. In addition, a material of the aforementioned silicon-containing mixture is silicon oxide ($SiO_x$).

According to a preferred embodiment of the present invention, a formula (I) of the ester compound is shown as follows:

where the $R_1$ is selected from the group consisting of hydrogen and C1-C3 alkyl radical, and the $R_2$ is selected from the group consisting of substituted and un-substituted C5-C18 linear and branched alkyl radical, substituted and un-substituted C5-C18 cyclic alkyl radical, and substituted and un-substituted C5-C18 aromatic radical.

A colored layer 209 is disposed in the apertures 205. The colored layer 209 may be a red, a green, a blue colored layer or any combination thereof. The color filter 200 of the present invention, which changes a surface property of the black matrix 203 by applying the ink-repellent layer thereon, provides better separation between the portions of the colored layer 209. However, a person skilled in the art can understand that the present invention can be embodied by covering the colored layer 209 with a protective film (not shown) and a transparent ITO in turn, if necessary, and thus further details do not need to be given herein.

As mentioned above, a method of fabricating a color filter of the LCD panel is further provided in the present invention. In order to describe the method of fabricating the color filter of the LCD panel of the present invention more explicitly and completely, the following description is stated with reference to FIGS. 5(a) to 6(b).

Figure 5A:
FIGS. 5(a) to 5(d) are cross-sectional diagrams of the process of color filter of the LCD panel in accordance with a preferred embodiment of the present invention.
Figure 5B:
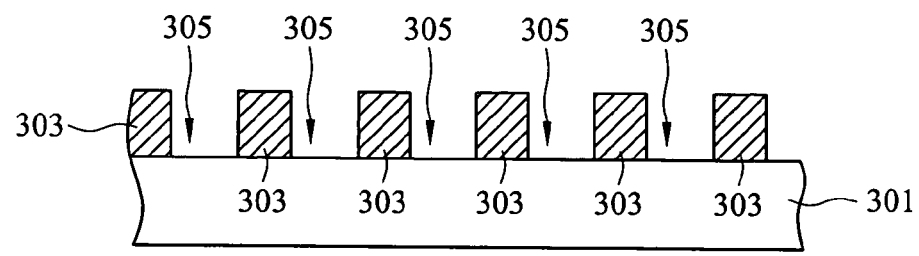
Figure 5C:
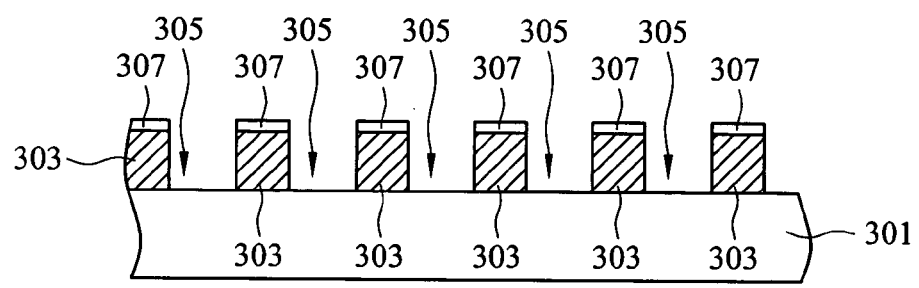
Figure 5D:
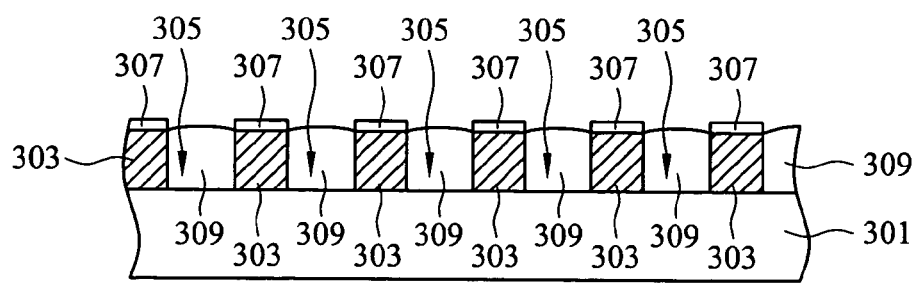

Reference is made to FIGS. 5(a) to 5(d), which are cross-sectional diagrams in the process of color filter of the LCD panel in accordance with a preferred embodiment of the present invention. Reference is made to FIG. 5(a); a transparent substrate 301 is provided, and a material of the transparent substrate 301 is, for example, glass. Next, a black matrix 303 is formed on the transparent substrate 301. A material of the black matrix 303 is, for example, resin or metal. A plurality of apertures 305 is located in the black matrix 303 to expose a part of the transparent substrate 301 for forming the structure as shown in FIG. 5(b). Subsequently, an ink-repellent layer 307 is formed on the black matrix 303. A material of the ink-repellent layer 307 comprises an ester compound and a silicon-containing mixture for forming the structure as shown in FIG. 5(c). The ester compound and the silicon-containing mixture, as such, are discussed in details as mentioned in the above, and thus they do not need to be described again. Later, an ink-jet method, such as Piezoelectric ink-jet method or the thermal bubble ink-jet method, is employed to inject color resist ink drops into the aforesaid apertures 305 for forming a colored layer 309 therein. The colored layer 309 may be a red, a green, a blue colored layer or any combination thereof for forming the structure as shown in FIG. 5(d).

Figure 6A:
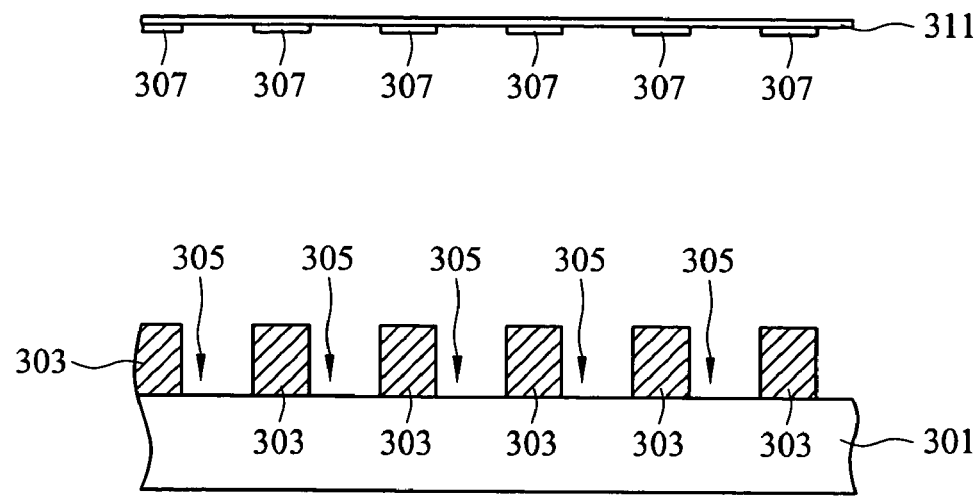
FIGS. 6(a) to 6(b) are cross-sectional diagrams of the process of color filter of the LCD panel in accordance with another preferred embodiment of the present invention
Figure 6B:
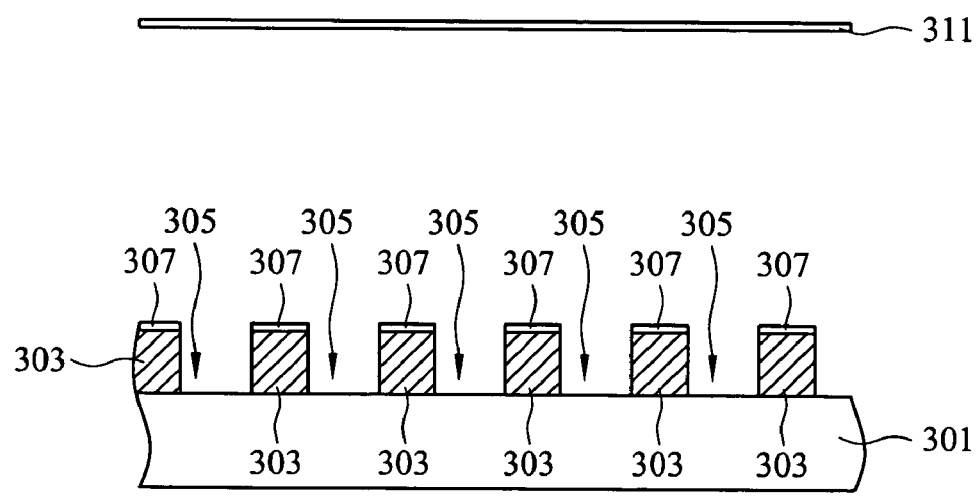

According to a preferred embodiment of the present invention, the ink-repellent layer 307 can be directly formed on the black matrix 303. According to another preferred embodiment of the present invention, the ink-repellent layer 307 can be also indirectly formed on the black matrix 303. Reference is made to FIGS. 6(a) to 6(b), which are cross-sectional diagrams of the process of color filter of the LCD panel in accordance with another preferred embodiment of the present invention. When the ink-repellent layer 307 is indirectly formed on the black matrix 303, a coating step is first performed, where the ink-repellent layer 307 is coated onto a transferred film 311, and then the transferred film 311 is formed with the ink-repellent layer 307. Subsequently, a transferring step is performed, where the ink-repellent layer 307 is transferred from the transferred film 311 onto the black matrix 303, thus forming the ink-repellent layer 307 on the black matrix 303 so as to form the structure shown in FIG. 6(b).

It is worthy to mention that the color filter of the LCD panel of the present invention, the surface property of the black matrix of which is changed by coating with the ink-repellent layer, provides better separation of the colored layer portions from each other, so as to avoid overflowing while color ink drops are attaching onto the transparent substrate. Moreover, the ink-repellent layer is cheap and less of the same is used, and this method of the present invention greatly diminishes steps of exposure and development. The cost and time of fabricating the color filter can thus be drastically reduced.

Therefore, according to the aforementioned preferred embodiments, one advantage of the color filter of the LCD panel of the present invention is that the color filter utilizes an ink-repellent layer, which is formed with cheap materials, to change a surface property of a black matrix for better separating portions of a colored layer from each other, so as to prevent the colored ink drops from overflowing while color ink drops are attaching onto the transparent substrate.

According to the aforementioned preferred embodiments, another advantage of the method of fabricating the color filter of the LCD panel of the present invention is that, the ink-repellent layer is transferred onto the black matrix, and then the colored layer is formed thereon. Therefore, the ink-repellent layer can effectively isolate the colored layer and prevent the colored ink drops from overflowing during color ink drops attaching onto the transparent substrate in the prior art. Furthermore, the ink-repellent layer is cheap and less in usage, and steps of exposure and development can be reduced, so as to greatly diminish the cost and time of fabricating the color filter.

As is understood by a person skilled in the art, the foregoing preferred embodiments of the present invention are illustrated of the present invention rather than limiting of the present invention. It is intended that various modifications and similar arrangements be included within the spirit and scope of the appended claims, the scope of which should be accorded the broadest interpretation so as to encompass all such modifications and similar structure.

What is claimed is:

1. A black matrix of color filter, characterized by:
an ink-repellent layer disposed on the black matrix, wherein the material of the ink-repellent layer comprises an ester compound and a silicon-containing mixture, and the material of the silicon-containing mixture is silicon oxide ($SiO_x$).

2. The black matrix of color filter according to claim 1, wherein the material of the black matrix is selected from a group consisting of resin and metal.

3. The black matrix of color filter according to claim 1, wherein the formula (I) of the ester compound is shown as follows:

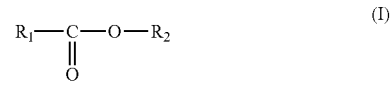

wherein R1 is selected from a group consisting of hydrogen and C1-C3 alkyl radical, and R2 is selected from a group consisting of substituted and un-substituted C5-C18 linear and branched alkyl radical, substituted and un-substituted C5-C18 cyclic alkyl radical, and substituted and un-substituted C5-C18 aromatic radical.

4. A color filter of liquid crystal display (LCD) panel, comprising:
a transparent substrate;
a black matrix disposed on the transparent substrate and having a plurality of apertures to expose part of the transparent substrate;
an ink-repellent layer disposed on the black matrix, wherein the material of the ink-repellent layer comprises an ester compound and a silicon-containing mixture, and the material of the silicon-containing mixture is silicon oxide ($SiO_x$); and
a colored layer formed in the apertures by an ink-jet method.

5. The color filter of LCD panel according to claim 4, wherein the material of the transparent substrate is glass.

6. The color filter of LCD panel according to claim 4, wherein the material of the black matrix is selected from a group consisting of resin and metal.

7. The color filter of LCD panel according to claim 4, wherein the formula (I) of the ester compound is shown as follows:

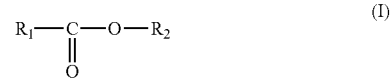

wherein R1 is selected from a group consisting of hydrogen and C1-C3 alkyl radical, and R2 is selected from a group consisting of substituted and un-substituted C5-C18 linear and branched alkyl radical, substituted and un-substituted C5-C18 cyclic alkyl radical, and substituted and un-substituted C5-C18 aromatic radical.

8. The color filter of LCD panel according to claim 4, wherein the apertures are arranged in an array selected from a group consisting of mosaic, triangular, and striped patterns.

9. The color filter of LCD panel according to claim 4, wherein the colored layer is selected from a group consisting of a red colored layer, a blue colored layer, a green colored layer, or any combination thereof.

10. The color filter of LCD panel according to claim 4, wherein the ink-jet method is selected from a group consisting of Piezoelectric ink-jet method and thermal bubble ink-jet method.

11. A method of fabricating color filter of LCD panel, comprising:
providing a transparent substrate;
forming a black matrix on the transparent substrate, wherein the black matrix has a plurality of apertures to expose a part of the transparent substrate;
forming an ink-repellent layer on the black matrix, wherein the material of the black matrix comprises an ester compound and a silicon-containing mixture, and the material of the silicon-containing mixture is silicon oxide ($SiO_x$); and
forming a colored layer into the apertures by an ink-jet method.

12. The method of fabricating color filter of LCD panel according to claim 11, wherein the material of the transparent substrate is glass.

13. The method of fabricating color filter of LCD panel according to claim 11, wherein the material of the black matrix is selected from a group consisting of resin and metal.

14. The method of fabricating color filter of LCD panel according to claim 11, wherein the formula (I) of the ester compound is shown as follows:

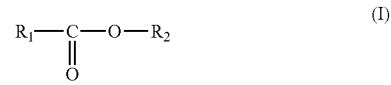

wherein R1 is selected from a group consisting of hydrogen and C1-C3 alkyl radical, and R2 is selected from group consisting of substituted and un-substituted C5-C18 linear and branched alkyl radical, substituted and un-substituted C5-C18 cyclic alkyl radical, and substituted and un-substituted C5-C18 aromatic radical.

15. The method of fabricating color filter of LCD panel according to claim 11, wherein the step of forming the ink-repellent layer further comprises:
coating the ink-repellent layer onto a transferred film, whereby the transferred film is formed with the ink-repellent layer; and
transferring the ink-repellent layer from the transferred film onto the black matrix, whereby the ink-repellent layer is formed on the black matrix.

16. The method of fabricating color filter of LCD panel according to claim 11, wherein the apertures are arranged in an array selected from a group consisting of mosaic, triangular, and striped patterns.

17. The method of fabricating color filter of LCD panel according to claim 11, wherein the colored layer is selected from a group consisting of a red colored layer, a blue colored layer, a green colored layer, or any combination thereof.

18. The method of fabricating color filter of LCD panel according to claim 11, wherein the ink-jet method is selected from a group consisting of Piezoelectric ink-jet method and thermal bubble ink-jet method.

* * * * *